US011811643B2

(12) United States Patent
French

(10) Patent No.: US 11,811,643 B2
(45) Date of Patent: *Nov. 7, 2023

(54) SYSTEM AND METHOD FOR MANAGING COMPUTING RESOURCES

(71) Applicant: Arista Networks, Inc., Santa Clara, CA (US)

(72) Inventor: John W. French, Pacifica, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,321

(22) Filed: Apr. 25, 2022

(65) Prior Publication Data

US 2022/0321450 A1    Oct. 6, 2022

Related U.S. Application Data

(63) Continuation of application No. 16/677,633, filed on Nov. 7, 2019, now Pat. No. 11,336,557.

(51) Int. Cl.
*H04L 45/028* (2022.01)

(52) U.S. Cl.
CPC ................. *H04L 45/028* (2013.01)

(58) Field of Classification Search
CPC ....... H04L 43/16; H04L 45/123; H04L 45/20; H04L 63/0281; H04L 63/1416; H04L 63/101; H04L 2463/146; G06F 11/3433; G06F 21/554

See application file for complete search history.

(56) References Cited

U.S. PATENT DOCUMENTS

| 7,117,533 | B1* | 10/2006 | Libenzi | H04L 63/0254 |
| | | | | 709/224 |
| 10,659,462 | B1 | 5/2020 | Kim et al. | |
| 2004/0003286 | A1* | 1/2004 | Kaler | G06F 21/554 |
| | | | | 726/25 |
| 2008/0177994 | A1 | 7/2008 | Mayer | |
| 2013/0163476 | A1* | 6/2013 | Meghani | H04L 65/1046 |
| | | | | 370/259 |
| 2014/0022997 | A1 | 1/2014 | Xue | |
| 2015/0188937 | A1* | 7/2015 | Wu | H04L 63/1416 |
| | | | | 726/22 |
| 2015/0341373 | A1* | 11/2015 | Solis | H04L 63/1416 |
| | | | | 726/23 |
| 2017/0078210 | A1* | 3/2017 | Wang | H04L 47/32 |
| 2017/0207995 | A1* | 7/2017 | Gao | H04L 45/36 |
| 2017/0208083 | A1* | 7/2017 | Gurney, III | H04L 63/0236 |
| 2017/0302690 | A1* | 10/2017 | Wu | H04L 63/1416 |
| 2017/0331842 | A1* | 11/2017 | Kikuchi | H04L 63/0227 |

(Continued)

*Primary Examiner* — Mahran Y Abu Roumi
(74) *Attorney, Agent, or Firm* — Sprinkle IP Law Group

(57) ABSTRACT

A network device includes storage. The network device also includes a forwarding information manager. The storage stores forwarding information. The storage also stores information source rankings. The forwarding information manager obtains information from a source. The information source rankings include a ranking associated with the source. The forwarding information manager makes a determination, based on the information source rankings, that the source is undesirable. The forwarding information manager discards the information without processing the information based on the determination.

17 Claims, 11 Drawing Sheets

(56) References Cited

U.S. PATENT DOCUMENTS

2018/0287902 A1\* 10/2018 Chitalia .............. G06F 11/3433
2020/0099630 A1\* 3/2020 Stolarchuk ............ H04L 43/062
2022/0247748 A1\* 8/2022 Kim ...................... H04L 63/101

\* cited by examiner

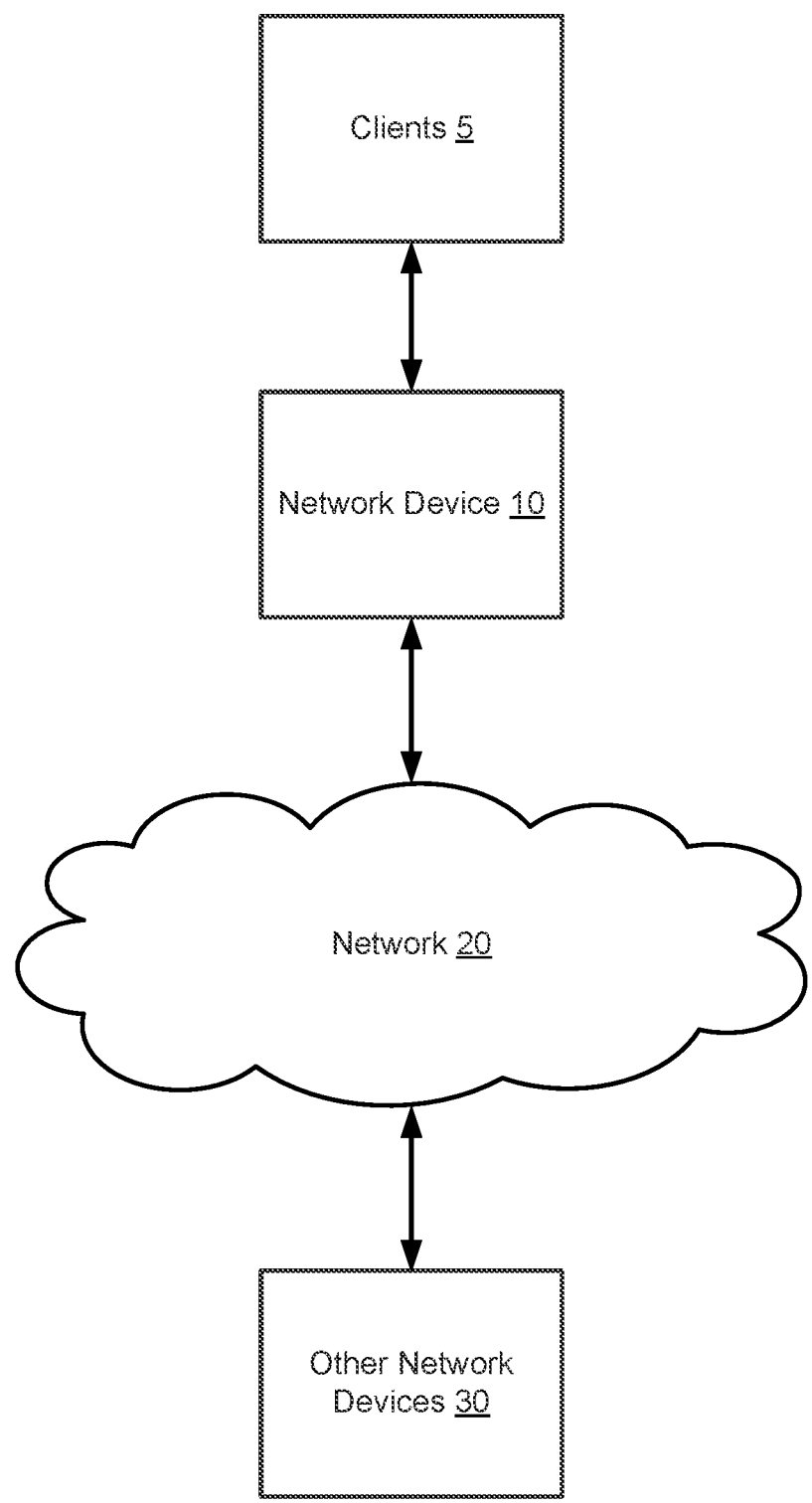
FIG. 1.1

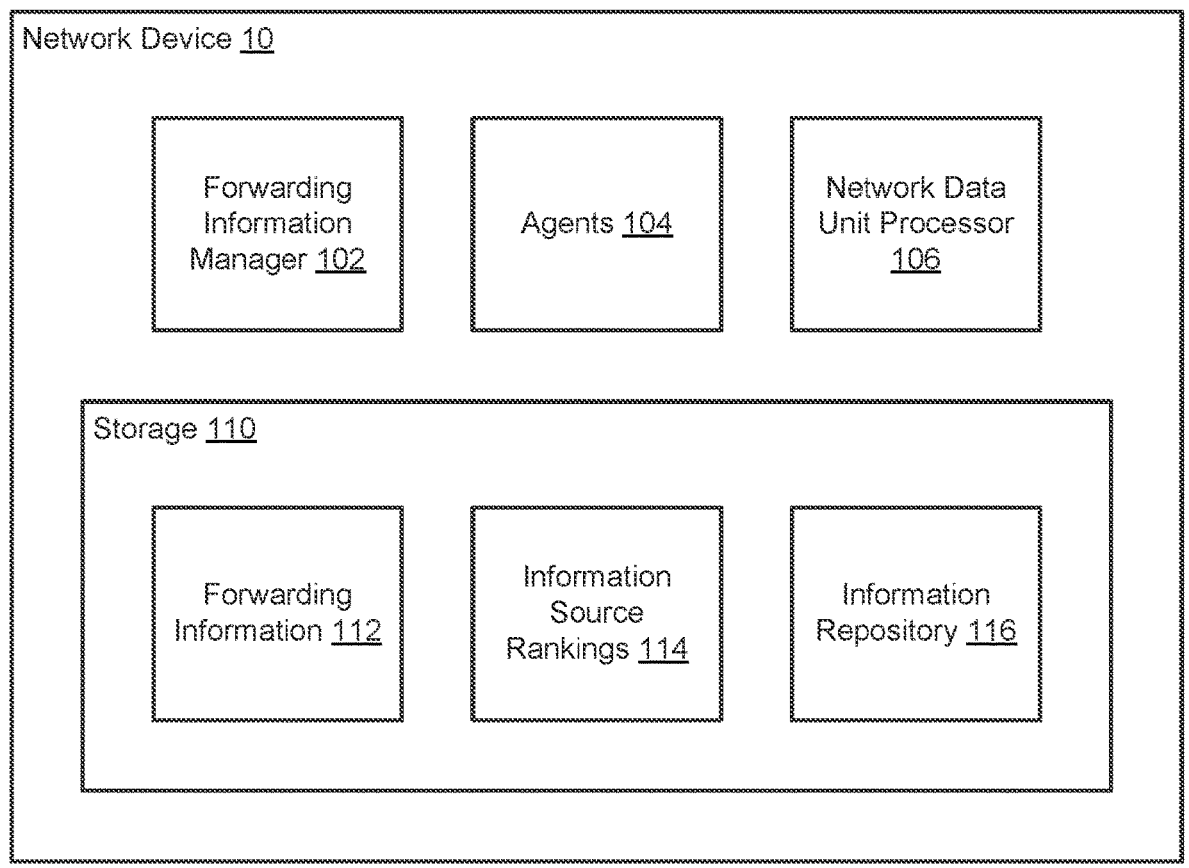
FIG. 1.2

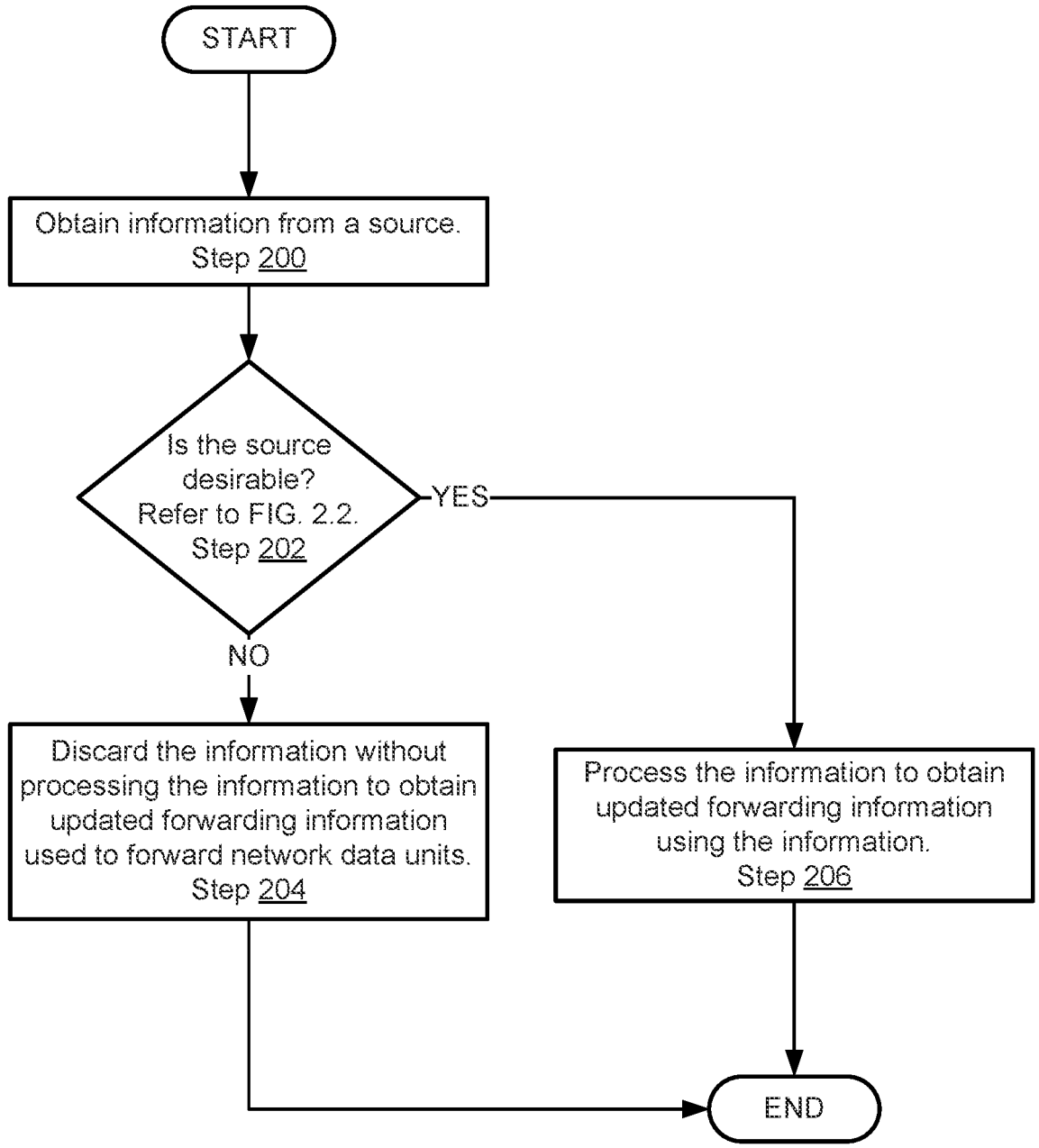
FIG. 2.1

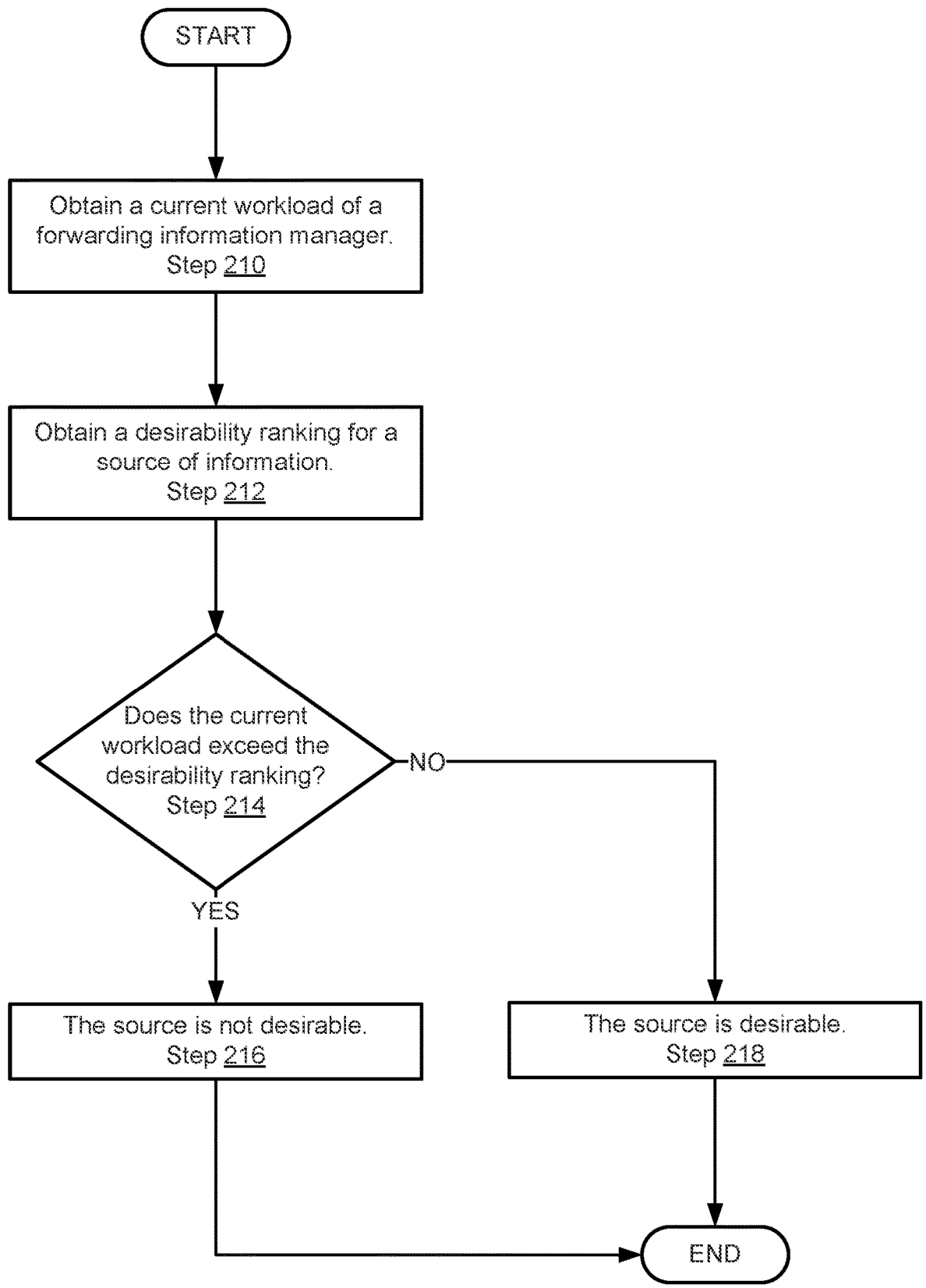
FIG. 2.2

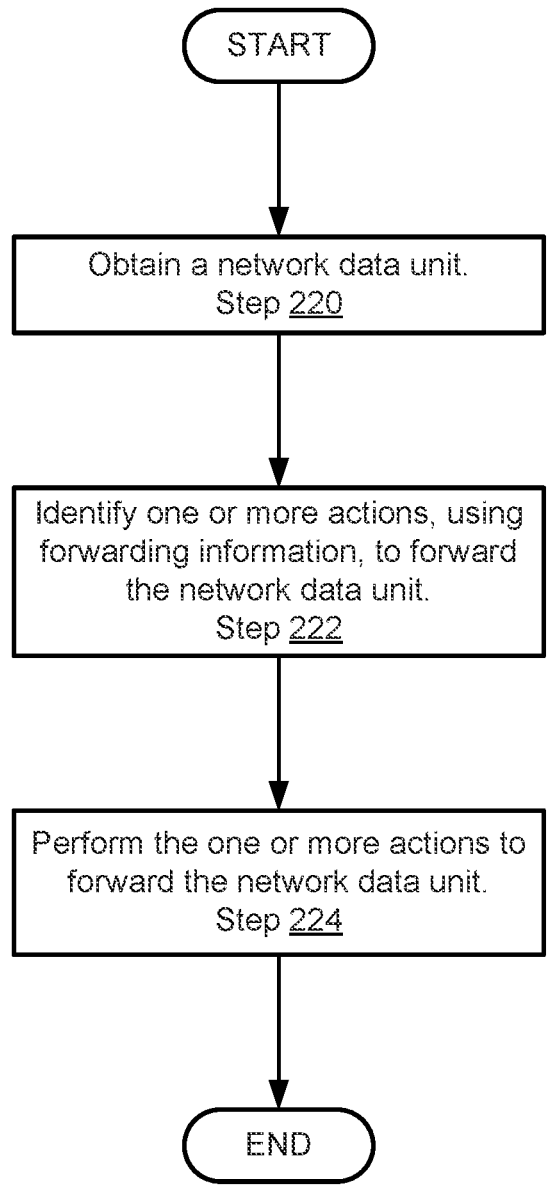
FIG. 2.3

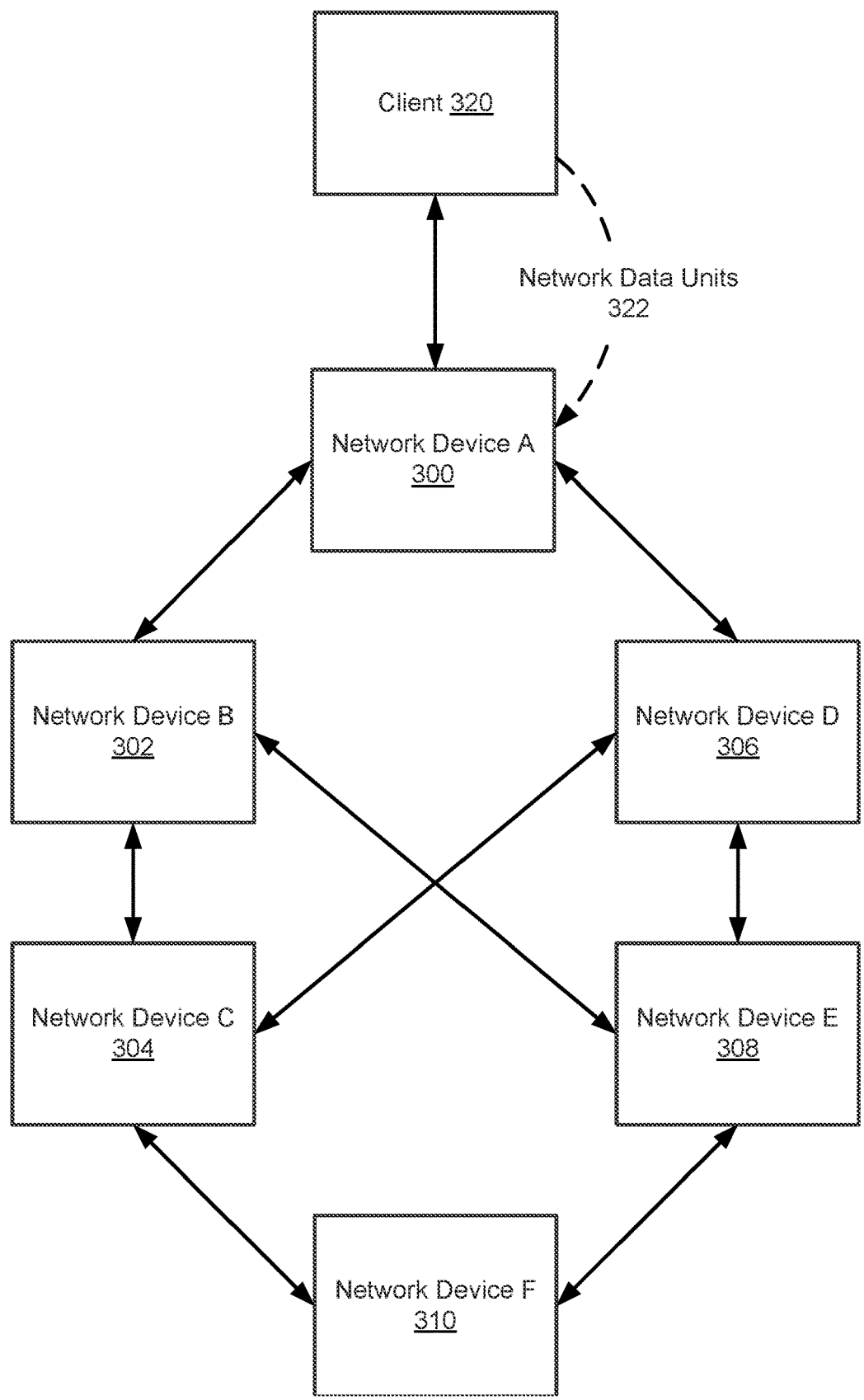
FIG. 3.1

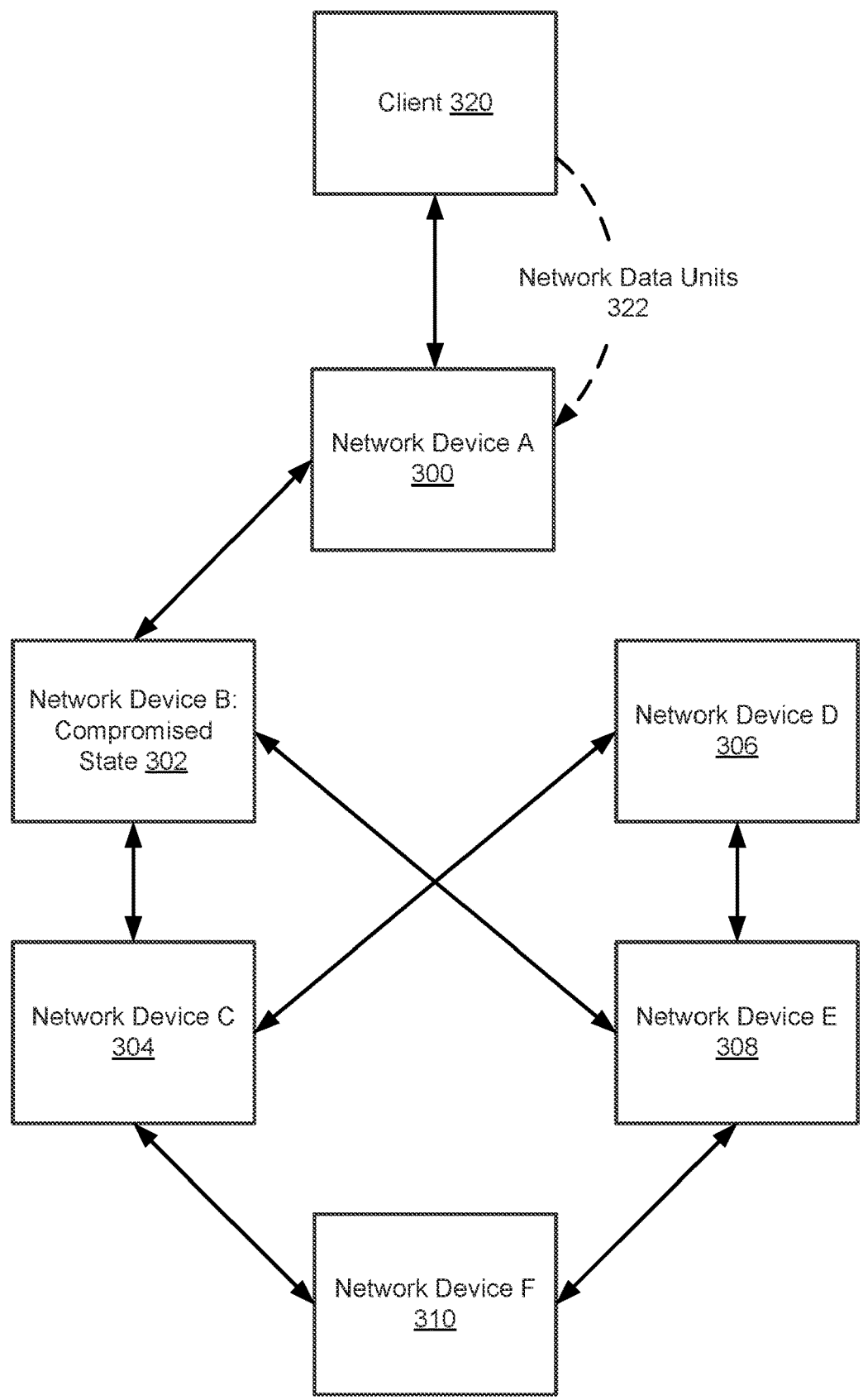
FIG. 3.2

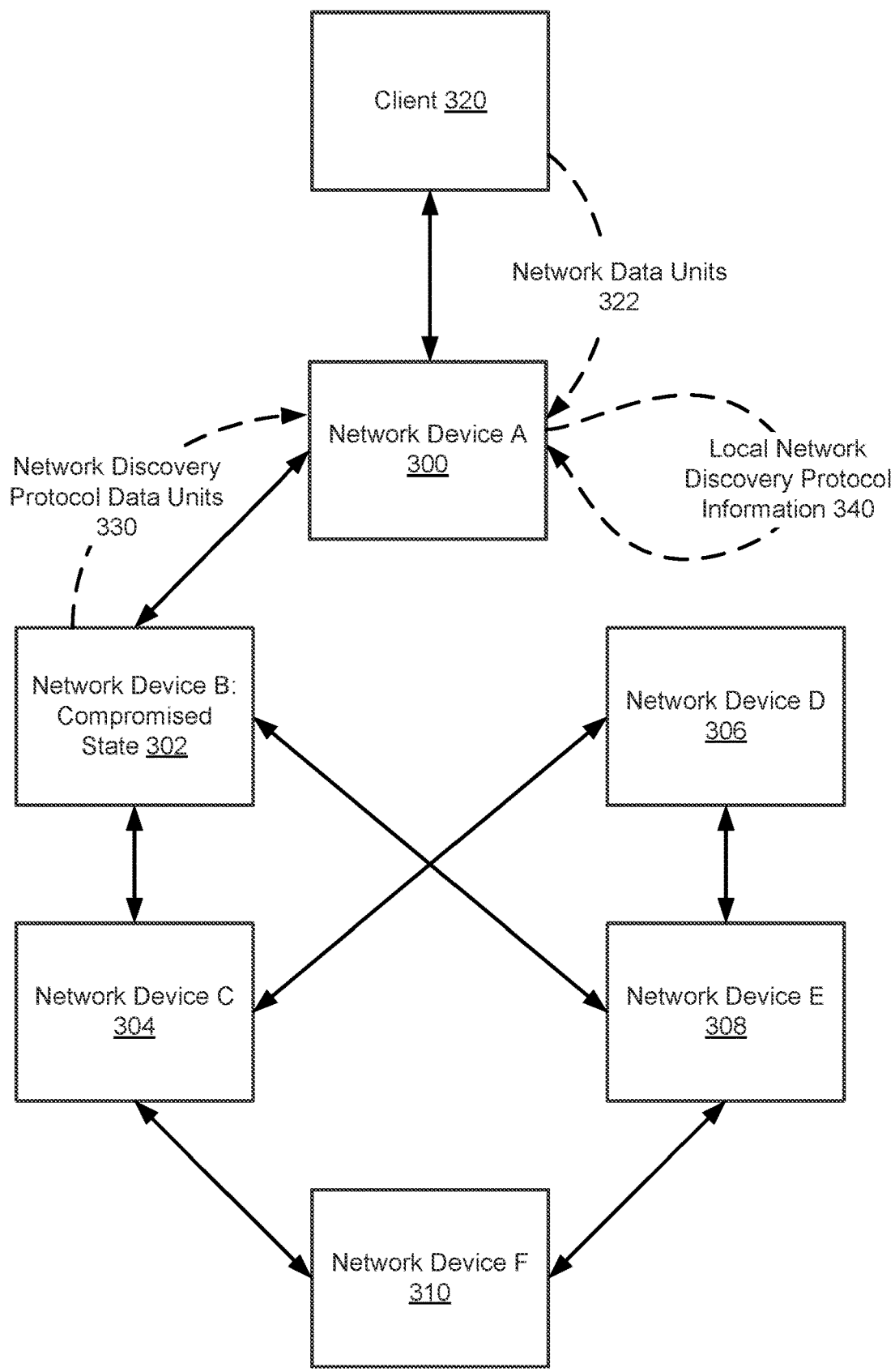
FIG. 3.3

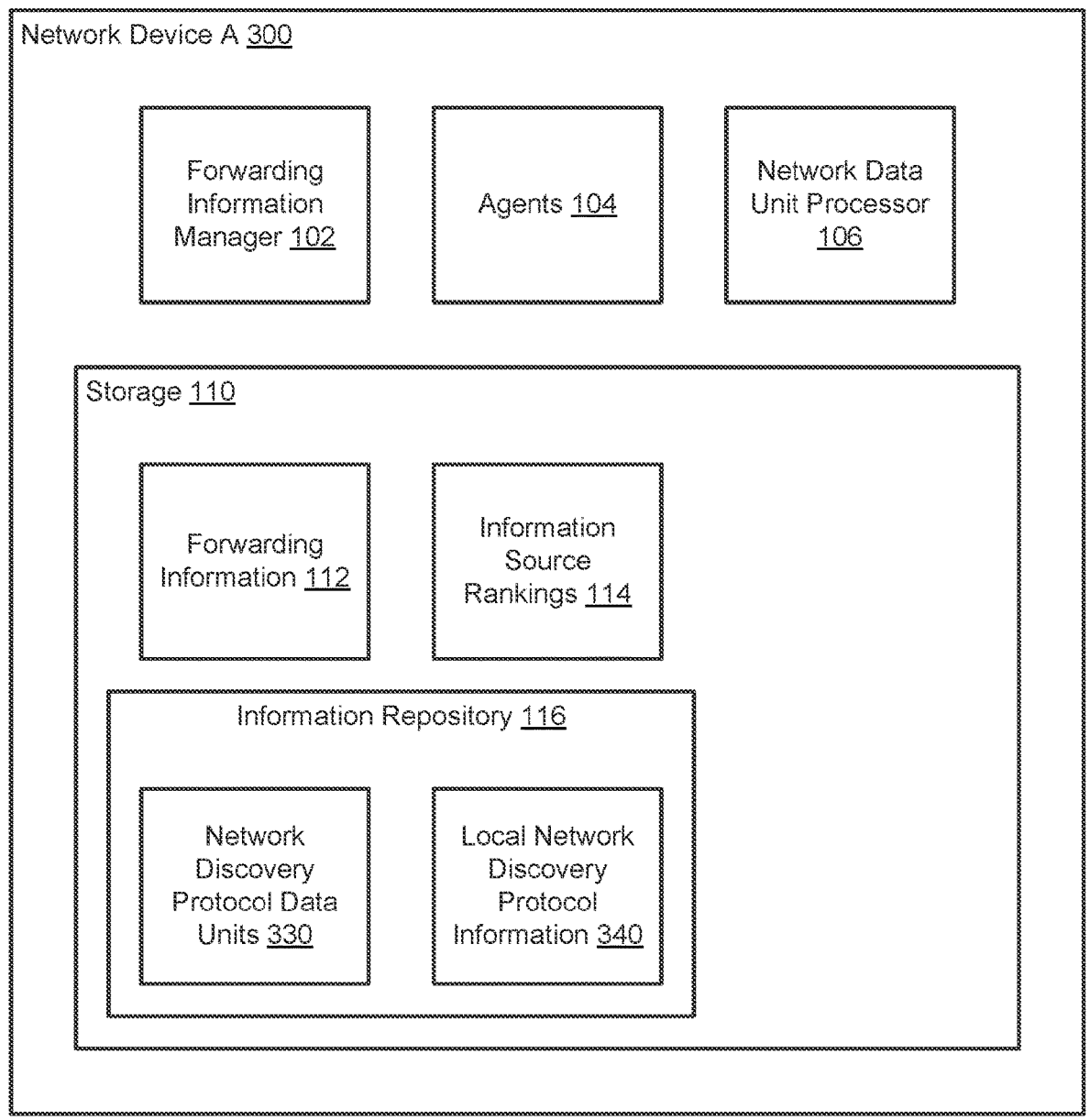
FIG. 3.4

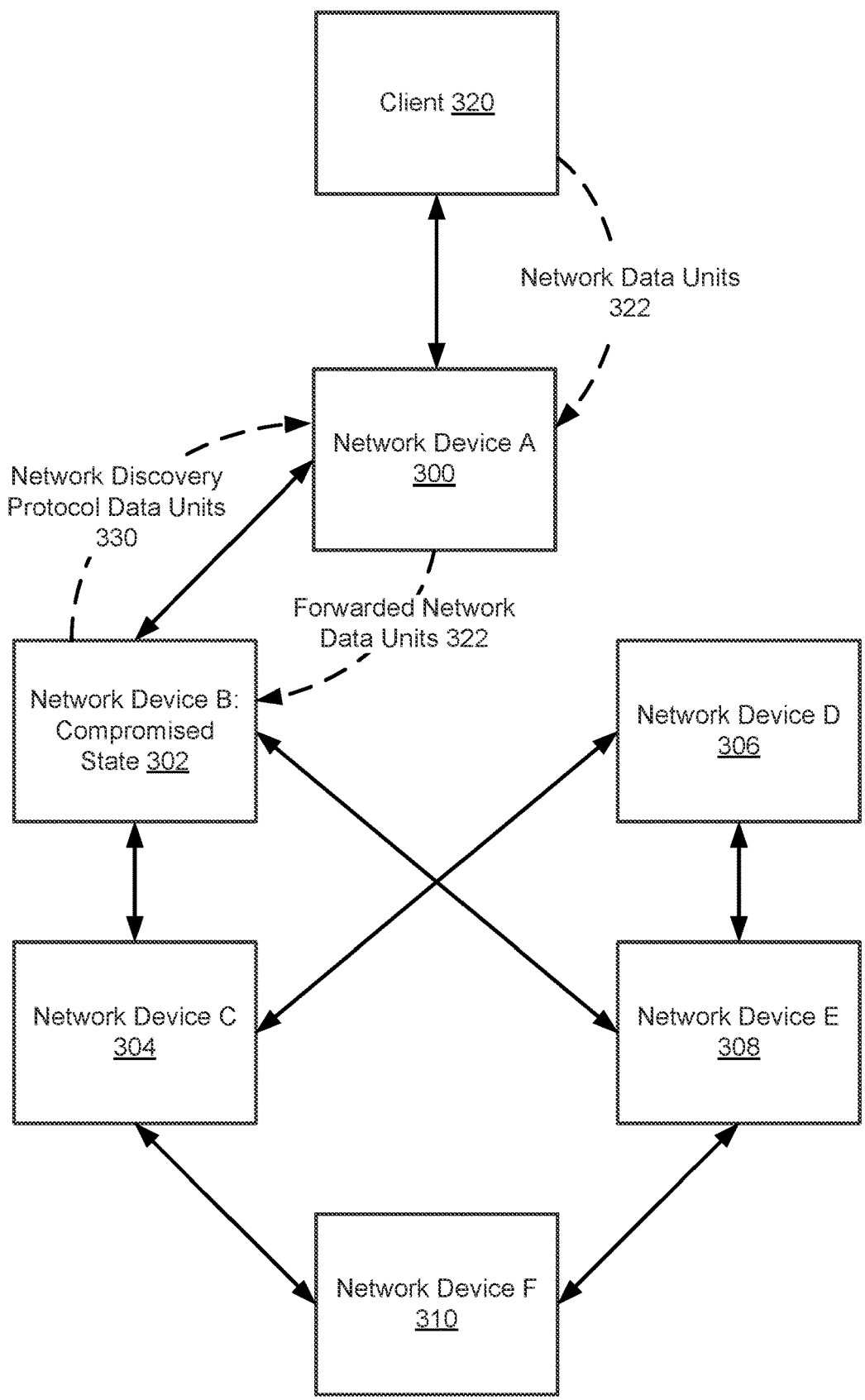
FIG. 3.5

SYSTEM AND METHOD FOR MANAGING COMPUTING RESOURCES

CROSS-REFERENCE TO RELATED APPLICATIONS

This application is a continuation of U.S. patent application Ser. No. 16/677,663, filed Nov. 7, 2019, issued as U.S. Pat. No. 11,336,557, entitled "System and Method for Managing Computing Resources", the content of which is hereby incorporated by reference in its entirety.

BACKGROUND

Computing devices may utilize computing resources to perform their functionality. For example, computing devices may utilize processing resources to execute instructions, memory resources to temporarily store data, storage resources to store data long term, etc.

Computing devices may include a limited quantity of computing resources. For example, computing devices may include a finite number of processors that provide processing resources, memory modules that provide memory resources, storage devices that provide storage resources, etc.

SUMMARY

In one aspect, a network device in accordance with one or more embodiments of the invention includes storage and a forwarding information manager. The storage stores forwarding information and information source rankings. The forwarding information manager obtains information from a source; makes a determination, based on the information source rankings, that the source is undesirable; and based on the determination, discards the information without processing the information.

In one aspect, a method in accordance with one or more embodiments of the invention includes obtaining information from a source; making a determination, based on information source rankings, that the source is undesirable, the information source rankings include a first ranking associated with the source; and based on the determination, discarding the information without processing the information.

In one aspect, a non-transitory computer readable medium in accordance with one or more embodiments of the invention includes computer readable program code, which when executed by a computer processor enables the computer processor to perform a method. The method includes obtaining information from a source; making a determination, based on information source rankings, that the source is undesirable, the information source rankings include a first ranking associated with the source; and based on the determination, discarding the information without processing the information.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

FIG. 1.1 shows a diagram of a system in accordance with one or more embodiments disclosed herein.

FIG. 1.2 shows a diagram of a network device in accordance with one or more embodiments disclosed herein.

FIG. 2.1 shows a flowchart of updating forwarding information in accordance with one or more embodiments disclosed herein.

FIG. 2.2 shows a flowchart of method of determining whether a source is desirable in accordance with one or more embodiments disclosed herein.

FIG. 2.3 shows a flowchart of a second method of forwarding network data units in accordance with one or more embodiments disclosed herein.

FIGS. 3.1-3.5 show a non-limiting example of a system at different point in time in accordance with embodiments disclosed herein.

DETAILED DESCRIPTION

Figure 4:
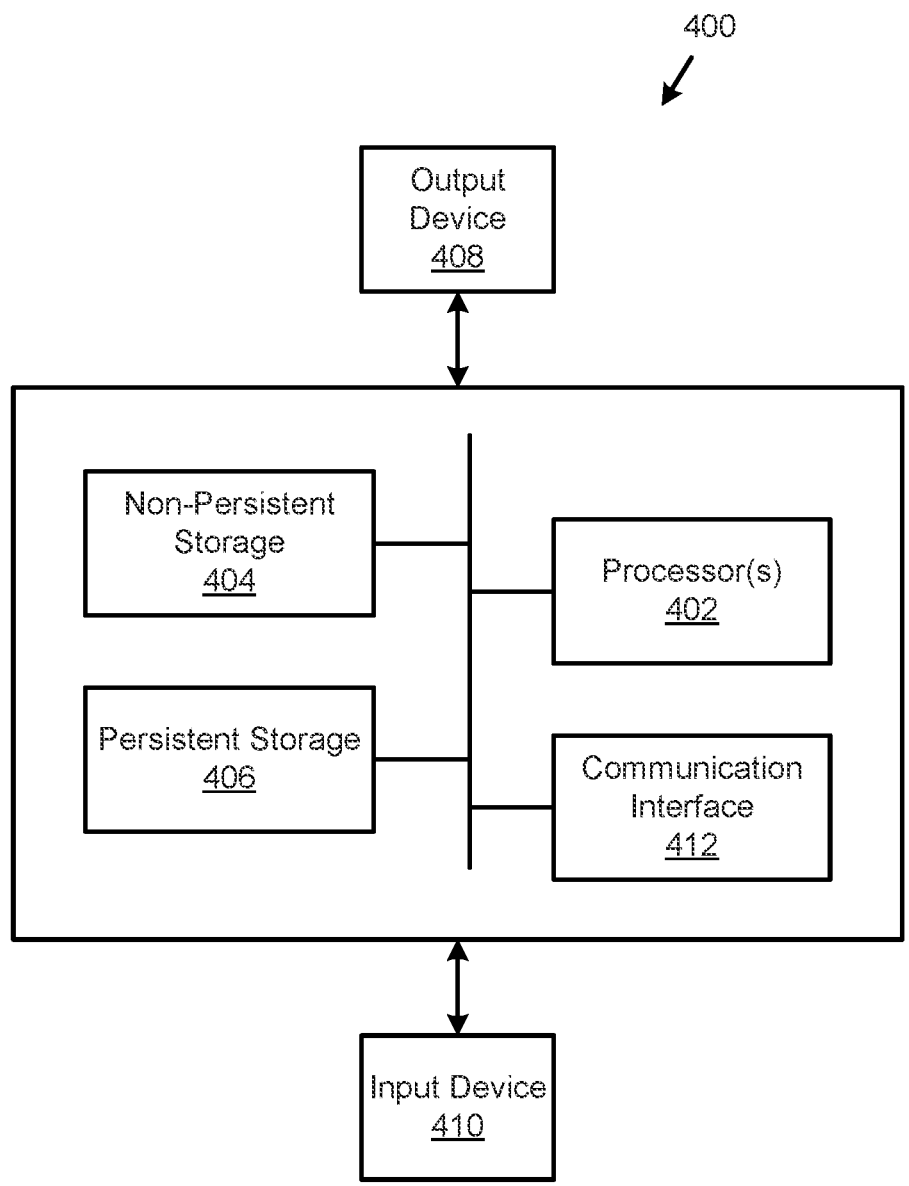
FIG. 4 shows a diagram of a computing device in accordance with one or more embodiments disclosed herein.

Specific embodiments will now be described with reference to the accompanying figures. In the following description, numerous details are set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods and systems for processing information regarding the topology or other characteristics of a network environment. Specifically, embodiments disclosed herein may provide a method for selectively processing such information that is likely to improve the operation of the network device for, for example, updating the forwarding behavior of the network device. By selectively processing only portions of the information, the limited computing resources of a network device may be more efficiently marshalled for updating the operation of the network device. By doing so, the forwarding behavior (or other operational behavior) of the network device may be updated more quickly and/or in a manner that is more likely to improve the forwarded behavior of the network device.

A network device in accordance with embodiments disclosed herein may selectively process information based on a source of the information. For example, the network device may selectively choose not to processes such information from a particular entity that is unlikely to provide relevant information that may be used to update the forwarding behavior or other operational behavior of the network device.

In some embodiments disclosed herein, the network device may selectively choose to not process such information from a particular entity for a period of time. By doing so, should relevant information be obtained in the future from the particular entity, such information may be processed by the network device to update its forwarding behavior or other operational behavior.

FIG. 1.1 shows a diagram of an example system in accordance with one or more embodiments described herein. The system may include clients (5) that utilize services provided by a network device (10). The services provided by the network device (10) may include, for example, network data unit forwarding services. By forwarding network data units, the network device (10) may enable the clients (5) to communicate with other devices (e.g., network 20, other network devices (30)).

For example, the network device (10) may be operably connected to other network devices (30) via a network (20). The network device (10), network (20), and other network devices (30) may cooperate (e.g., all implement one or more common network communication protocols) to forward network data units to each other. The network device (10) may also forward network data units to the clients (5). The network data units may include messages destined for the various devices of the example system.

Forwarding network data units may consume computing resources of the devices of FIG. 1.1. For example, when a network data unit is sent from the clients (5) to the network device (10), the network device (10) may need to perform one or more actions to determine to which device (e.g., a device of the network (20) or another device not illustrated in FIG. 1.1) to forward the network data unit.

In addition to forwarding network data units, the network device (10) may also perform other functions. For example, the network device (10) may update its network data unit forwarding functionality based on information obtained from a variety of sources. To update its network data unit forwarding functionality, the network device (10) may perform actions (e.g., processing information regarding a structure of the topology of the example system) to maintain information (e.g., forwarding information) which the network device (10) uses to decide to which devices to forward network data units.

While each of the devices of FIG. 1.1 are illustrated as being operably connected to other devices using lines having double ended arrows as ends, such lines may represent any number of physical connections over which the network data units may be forwarded. For example, the line between the network device (10) and the network (20) may represent ten physical connections between the network device (10) and devices of the network (20). In such a scenario, network data units received by the network device (10) may be forwarded towards the network (20) and/or the other network devices (30) using any of the ten physical connections.

In another example, the line between the network device (10) and the network (20) may represent a connection between the network device (10) and another device (not shown) which is, in turn, physically connected to a device of the network (20). In such a scenario, network data units received by the network device (10) may be forwarded towards the network (20) and/or other network devices (30) using the connection to the another device (not shown) and the connection between the another device and the device of the network (20).

To select a physical connection (e.g., an egress port) over which to forward network data units, the network device (10) may utilize information (e.g., forwarding information) which it maintains for forwarding purposes. Performing the one or more actions to maintain the forwarding information may consume computing resources of the network device (10). For example, the network device (10) may need to access data structures that are stored in memory (i.e., consume memory resources), perform computations (i.e., consume processing resources), and/or perform other actions that consume computing resources. Depending on the demand for computing resources of the network device (10), the network data unit forwarding capacity of the network device (10) may become limited (e.g., insufficient computing resources to complete the one or more actions necessary to forward a network data unit) which may impact the ability of the network device (10) to provide its network data unit forwarding functionality.

In one or more embodiments disclosed herein, a network device (10) rations its computing resources to improve the likelihood that sufficient computing resources are available for network data unit forwarding functionality. To ration its computing resources, the network device (10) may limit the amount of information processed to update its forwarding information. For example, the network device (10) may automatically elect to only process a portion of the information that may be used to update its forwarding information. By doing so, the quantity of computing resources utilized for updating forwarding information may be reduced while increasing the quantity of computing resources that are available for network data unit forwarding purposes.

Any of the components of FIG. 1.1 may be operably connected by any combination and/or number of wired and/or wireless connections.

As discussed above, the system of FIG. 1.1 may include network devices that may provide network data unit forwarding services. Any of the devices of FIG. 1.1 may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-2.3. The devices of FIG. 1.1 may be implemented using other types of computing devices without departing from the embodiments disclosed herein. For additional details regarding computing devices, refer to FIG. 4.

The devices of FIG. 1.1 may be implemented using logical devices without departing from the embodiments disclosed herein. For example, the devices of FIG. 1.1 may be implemented using virtual machines that utilize computing resources of any number of physical computing devices to provide their respective functionalities. The devices of FIG. 1.1 may be implemented using other types of logical devices without departing from the embodiments disclosed herein.

To further clarify aspects of network devices, a diagram of a network device (10) is provided in FIG. 1.2. Any of the network devices of FIG. 1.1 may be similar to the network devices illustrated in FIG. 1.2.

FIG. 1.2 shows a diagram of a network device (100) in accordance with one or more embodiments described herein. The network device (100) may provide any number of functionalities, including network data unit forwarding functionality. To provide network data unit forwarding functionality, the network device (10) may maintain forwarding information (112) used to forward network data units.

To maintain the forwarding information (112), the network device (10) may obtain information from any number of information sources. For example, some of the information sources may be agents (104) hosted by the network device (10). In another example, some of the information sources may be other network devices operably connected to the network device (10). The information sources may be other types of sources without departing from the embodiments disclosed herein.

Maintaining the forwarding information (112) may consume a portion of the computing resources (e.g., processing resources, memory resources, storage resources, communication resources, etc.) of the network device (10). The quantity of computing resources required to process information used to maintain the forward information (112) may change over time. Depending on the type of information obtained, processing the information for forwarding information updating purposes may limit the ability of the network device (10) to forward network data units or perform its other functionalities (e.g., by consuming computing resources that could otherwise be used to perform other functions).

For example, some of the agents (104) of the network device (10) may provide information for forwarding information update purposes at different points of time. Consequently, the quantity of computing resources required for processing information for forward information update purposes may change depending on the amount of information available for forwarding information update purposes. If the amount of obtained information is sufficiently large, processing the information for forwarding information updating purposes may limit the ability of the network device to provide its other functionalities while processing the information.

In another example, large amounts of information usable for forwarding information update purposes may be obtained from an information source that is compromised or otherwise operating in an undesirable manner (e.g., operating in a damaged state that results in the large amounts of information usable for forwarding information update purposes being obtained). Such a large amount of information, if processed for forwarding information updating purposes, may limit the amount of computing resources available network data unit forwarding and/or other functionality of the network device.

In a still further example, information usable for forwarding information updating purposes may be obtained from an information source that may not be helpful for updating the forwarding information. For example, the information that is not helpful may be redundant, duplicative, in error, or otherwise, if used to update the forwarding information, may not improve (or may detract from) the ability of the network device (10) to forward network data units or perform other functionalities.

In one or more embodiments disclosed herein, the network device (10) rations the quantity of computing resources allocated for forwarding information update purposes. By doing so, the network device (10) may improve the likelihood that the network device (10) may have sufficient computing resources available for network data unit forwarding purposes and/or other functionalities of the network device.

To provide the above noted functionality of the network device (100), the network device (100) may include a forwarding information manager (102), agents (104), a network data unit processor (106), and/or storage (110). Each of these components of the network device (100) is discussed below.

In one or more embodiments disclosed herein, the forwarding information manager (102) is implemented using a hardware device including circuitry. The forwarding information manager (102) may include, for example, a digital signal processor, a field programmable gate array, and/or an application specific integrated circuit. The circuitry of the aforementioned devices may be adapted to provide the functionality of the forwarding information manager (102). The forwarding information manager (102) may be implemented using other types of hardware devices without departing from the embodiments disclosed herein.

In one or more embodiments disclosed herein, the forwarding information manager (102) is implemented using computing code stored on a persistent storage that when executed by a processor performs the functionality of the forwarding information manager (102). The processor may be a hardware processor including circuitry such as, for example, a central processing unit or a microcontroller. The processor may be other types of hardware devices for processing digital information without departing from the embodiments disclosed herein.

In one or more embodiments disclosed herein, the forwarding information manager (102) provides forwarding information management services. Providing forwarding information management services may include (i) rationing computing resources for forwarding information updating services and (ii) maintaining forwarding information using the rationed computing resources. By doing so, the forwarding information manager (102) may limit the quantity of computing resources allocated for updating forwarding information and, consequently, increase the amount of computing resources available for other purposes when compared to a scenario in which computing resources allocated for maintaining forwarding information are not rationed.

To ration computing resources for forwarding information updating services, the forwarding information manager (102) may utilize information source rankings (114) that specify rankings (e.g., desirability rankings) of information sources. The rankings may be utilized to determine whether or not to process information for forwarding information updating purposes. For example, if the information source rankings (114) indicate that information obtained from an information source is undesirable, the information may not be processed for forwarding information updating purposes. Consequently, computing resources that would otherwise be allocated for processing the information for forwarding information updating purposes may be rationed (e.g., not used to process the information).

Maintaining the forwarding information may include (i) obtaining information from sources that may be used to update forwarding information, (ii) determining one or more updates to the forwarding information based on the obtained information, and (iii) modifying the forwarding information based on the one or more updates. The maintained forwarding information may specify how (e.g., an egress port, encapsulation information, etc.) to forward network data units. As noted above, rationing of computing resources may limit the amount of information used to maintain the forwarding information. For example, in some cases information that may be used for forwarding information updating purposes may not be processed. Consequently, maintaining the forwarding information may include selectively not processing information that could be used for forwarding information updating purposes.

To provide the above noted functionality, the forwarding information manager (102) may perform all, or a portion, of the methods illustrated in FIGS. 2.1-2.3.

In one or more embodiments disclosed herein, the agents (104) are implemented using a hardware device including circuitry. The agents (104) may include, for example, a digital signal processor, a field programmable gate array, and/or an application specific integrated circuit. The circuitry of the aforementioned devices may be adapted to provide the functionality of the agents (104). The agents (104) may be implemented using other types of hardware devices without departing from the embodiments disclosed herein.

In one or more embodiments disclosed herein, the agents (104) are implemented using computing code stored on a persistent storage that when executed by a processor performs the functionality of the agents (104). The processor may be a hardware processor including circuitry such as, for example, a central processing unit or a microcontroller. The processor may be other types of hardware devices for processing digital information without departing from the embodiments disclosed herein.

In one or more embodiments disclosed herein, the agents (104) provide functionalities. The functionalities may correspond to any of the functionalities provided by the network device. All, or a portion, of the agents (104) may provide information provisioning services. Information provisioning services may include providing information to other entities (e.g., the forwarding information manager (102)). All, or a portion, of the information provided by the agents (104) may be usable for updating of the forwarding information (112).

For example, some of the information provided by the agents (104) may reflect the physical connectivity between the network device (10) and other devices (e.g., directly or indirectly through other devices). The information provided by the agents (104) may reflect other types of information that may be used to update the forwarding information (112). The information may be obtained by the agents (104) via any method such as, for example, implementation of a network discovery protocol (e.g., Border Gateway Protocol (BGP)).

All, or a portion, of the agents (104) may provide other functionalities without departing from the embodiments disclosed herein. To provide the above noted functionality, the agents (104) may perform all, or a portion, of the methods illustrated in FIGS. 2.1-2.3.

In one or more embodiments disclosed herein, the network data unit processor (106) is implemented using a hardware device including circuitry. The network data unit processor (106) may include, for example, a digital signal processor, a field programmable gate array, and/or an application specific integrated circuit. The circuitry of the aforementioned devices may be adapted to provide the functionality of the network data unit processor (106). The network data unit processor (106) may be implemented using other types of hardware devices without departing from the embodiments disclosed herein.

In one or more embodiments disclosed herein, the network data unit processor (106) is implemented using computing code stored on a persistent storage that when executed by a processor performs the functionality of the network data unit processor (106). The processor may be a hardware processor including circuitry such as, for example, a central processing unit or a microcontroller. The processor may be other types of hardware devices for processing digital information without departing from the embodiments disclosed herein.

In one or more embodiments disclosed herein, the network data unit processor (106) provides network data unit processing services. Providing network data unit services may include (i) determining whether a network data unit should be forwarded, (ii) determining a method for forwarding a network data unit that should be forwarded based on information included in the forwarding information (112), and/or (iii) forwarding the network data unit in accordance with the determined method for forwarding a network data unit. Determining the method for forwarding the network data unit may include, for example, identifying an egress port, encapsulating information, and/or other actions to be performed to forward the network data unit.

To provide the above noted functionality, the network data unit processor (106) may perform all, or a portion, of the methods illustrated in FIGS. 2.1-2.3.

In one or more embodiments disclosed herein, the storage (110) is implemented using devices that provide data storage services (e.g., storing data and providing copies of previously stored data). The devices that provide data storage services may include hardware devices and/or logical devices. For example, the storage (110) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, the storage (110) may include a memory device (e.g., a dual in line memory device) in which data is stored and from which copies of previously stored data are provided. In another example, the storage (110) may include a persistent storage device (e.g., a solid state disk drive) in which data is stored and from which copies of previously stored data is provided. In a still further example, the storage (110) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The storage (110) may store data structures including forwarding information (112), information source rankings (114), an information repository (116), and/or other types of data structures. Each of these data structures is discussed below.

The forwarding information (112) may be a data structure that includes information that may be used to determine how to forward network data units. The forwarding information (112) may include any type and quantity of information for making the aforementioned determination.

For example, the forwarding information (112) may include information regarding egress ports out of which to forward network data units. The information may associate characteristics of network data units with one or more of the egress ports. In other words, the forwarding information (112) may associate one or more characteristics of network data units with respective egress ports.

In another example, the forwarding information (112) may include information regarding how to encapsulate network data units when forwarding the network data units out of egress ports. The encapsulating information may include, for example, headers to be appended to network data units, existing portions of network data units to be removed (e.g., stripped off) before forwarding, and/or other information specifying how the contents of the network data units are to be modified before being forwarded via an egress port.

One of ordinary skill will appreciate that an egress port may be a network port over which network data units may be forwarded to another network device. A network device may include any number of egress ports, ingress ports (e.g., network ports for receiving network data units from other entities), and/or other types of ports (e.g., tool ports for analysis of network data unit traffic).

In one or more embodiments disclosed herein, the forwarding information (112) is implemented as a list, table, and/or forwarding information hierarchy (e.g., nested lookup tables forming a forwarding information pipeline). The forwarding information (112) may be implemented as other types of data structures without departing from the embodiments disclosed herein.

The forwarding information (112) may be maintained by the forwarding information manager (102). For example, the forwarding information manager (102) may obtain information from sources regarding the topology (and/or other characteristics) of the network environment in which the network device (10) resides. The forwarding information manager (102) may obtain the information from, for example, the agents (104) and/or other entities hosted by other devices. The forwarding information manager (102) may use the aforementioned information to update the forwarding information (112). By doing so, the forwarding information (112) may be updated to more efficiently cause network data units to be forwarded.

The information source rankings (114) may be a data structure that includes information that may be used to determine whether a source of information is desirable. The information source rankings (114) may specify the relative (or absolute or other quantification metric of) desirability of all (or a portion) sources that may provide information that may be used to update the forwarding information.

For example, the information source rankings (114) may be implemented as a table that associates sources of information with corresponding rankings. The information source rankings (114) may be implemented using other types of data structures (e.g., lists, linked lists, etc.) without departing from the embodiments disclosed herein.

The information source rankings (114) may be maintained by any (and/or any number of) entity(ies). For example, the forwarding information manager (102) may obtain information regarding the desirability of each information source and may update the information source rankings (114) to reflect the obtained information. The forwarding information manager (102) may obtain such information from, for example, one or more of the agents (104) and/or entities hosted by other devices.

The information repository (116) may be a data structure for storing information that may be used to update the forwarding information (112). For example, the information repository (116) may be a queue of information obtained from the agents (104) and/or other entities that may be used to update the forwarding information (112). The queue may be used to temporarily store such information until the forwarding information manager (102) is able to process the information. The information repository (116) may be implemented using other types of data structures without departing from the embodiments disclosed herein.

While the data structures stored in the storage (110) have been described as including a limited amount of specific information, any of the data structures stored in the storage (110) may include addition, less, and/or different information without departing from the embodiments disclosed herein. Further, the aforementioned data structures may combined, subdivided into any number of data structures, may be stored in other locations (e.g., in a storage hosted by another device), and/or spanned across any number devices without departing from the embodiments disclosed herein.

As discussed above, a forwarding information manager (e.g., 102, FIG. 1.2) may update forwarding information (e.g., 112, FIG. 1.2) to modify the manner in which a network data unit processor (e.g., 106, FIG. 1.2) forwards network data units. FIGS. 2.1-2.2 show diagrams of methods that may be performed by a network device in accordance with one or more embodiment disclosed herein when updating forwarding information.

FIG. 2.1 shows a flowchart describing a method for updating forwarding information in accordance with one or more embodiments disclosed herein. The method may be performed by, for example, a forwarding information manager (e.g., 102, FIG. 1.2) of a network device. Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 200, information is obtained from a source.

In one or more embodiments disclosed herein, the information may be used to update forwarding information. For example, the information may reflect the topology (e.g., physical and/or logical connectivity) of a network environment in which a network device resides.

In one or more embodiments disclosed herein, the source may be an agent hosted by the network device. For example, the agent may be a program executing on the network device that provides network discovery services. The network discovery services may be, for example, the border gateway protocol or another type of service for ascertaining information regarding the network environment in which the network device resides.

In one or more embodiments disclosed herein, the source is another network device (or other type of computing device). For example, the source may be an agent hosted by another network device that provides information regarding the network environment in which the network device resides.

In one or more embodiments disclosed herein, the information is obtained by being stored in an information repository. For example, an agent or another device may add the information to the information repository. A forwarding information manager (102) may processes the information included in the information repository over time. Consequently, once the information is obtained the forwarding information manager (102) may processes the information unless the network device otherwise intervenes to prevent the information from being processed for forwarding information update purposes. For example, as noted above, the information repository may be implemented as a queue (e.g., first in, first out or other type of queue).

In Step 202, it is determined whether the source is desirable. If it is determined that the source is desirable, the method may proceed to step 206. If it is determined that the source is not desirable, the method may proceed to step 204.

In one or more embodiments disclosed herein, the determination is made via the method illustrated in FIG. 2.2. The determination may be made via other methods without departing from the embodiments disclosed herein.

In one or more embodiments disclosed herein, the determination is made by comparing an identity of the source to a black list. If the identity of the source is included in the blacklist, the source may be determined as being undesirable. If the identity of the source is not included in the blacklist, the source may be determined as being desirable.

The blacklist may be maintained by any entity. For example, the blacklist may be maintained by the forwarding information manager (e.g., 102, FIG. 1.2). The forwarding information manager may add identities to the blacklist based on any information type and/or source. The forwarding information manager may add the identities to the black list for periods of time. In other words, the identities of entities added to the blacklist may be automatically removed from the blacklist after a predetermined period of time, unless the blacklist is updated to extend the aforementioned periods of time.

For example, the black list may be implemented as a list of identities of sources and corresponding periods of time for each of the listed identities. Once the corresponding periods of time expire, the associated identities may be automatically removed from the blacklist.

In one or more embodiments of the invention, the determination is made by comparing an identity of the source to a white list. If the identity of the source is included in the whitelist, the source may be determined as being desirable. If the identity of the source is not included in the whitelist, the source may not be determined as being desirable.

Like the blacklist, the whitelist may be similarly maintained by any entity based on information obtained from any number of entities.

In one or more embodiments of the invention, the determination is made by comparing a desirability ranking of the source to a threshold. The desirability ranking of the source may be modified over time as information regarding the source is obtained. For example, the desirability ranking of the source may be a score varying from 0 to 100 with larger scores indicating higher levels of desirability. As information regarding the desirability of the source is obtained, the desirability ranking of the source may be increased or decreased to reflect the obtained information.

The threshold may be a desirability ranking value that, if exceeded, indicates that the source is desirable. For example, the threshold may be a desirability ranking value of 50. If the desirability ranking of the source exceeds 50, then the source may be determined as being desirable. Otherwise, the source may be determined as not being desirable.

In one or more embodiments of the invention, the threshold may change dynamically over time. The threshold may change dynamically depending on the workload of a device making the determination in step 202. For example, as the workload of the device increases, the threshold may increase. In contrast, as the workload of the device decreases, the threshold may decrease. In other words, the determination as to whether a source is desirable may change with respect to the workload of a device. As the workload increases, sources may need to have an increasingly higher desirability ranking to be determined as being desirable.

In Step 204, the information is discarded without processing the information. By not processing the information, the forwarding information used to forward network data units may not be updated based on the information.

In one or more embodiments disclosed here, the information is discarded by removing the information from the information repository before the information is processed. By doing so, computing resources will not be utilized to process the information. Consequently, the availability of computing resources of a network device may be improved when compared to a scenario in which all information that could be used to update forwarding information is processed for forwarding information update purposes.

In one or more embodiments disclosed herein, the information is discarded by screening the information by a network data unit processor. For example, the network data unit processor may obtain network data units from other entities (e.g., other network devices) that include all, or a portion, of the information. The network data units processor may discard the aforementioned network data units without adding them to an information repository. The network data units processor may do so by matching an identity of a source of the network data units to a corresponding desirability of the source specified by the information source rankings. If the source desirability is below a predetermined threshold, the network data units processor may discard the network data units including the (or a portion of) information without adding the network data units (or the information included in the network data units) to the information repository. By doing so, the information may be discarded by screening the information from being processed by the forwarding information manager In one or more embodiments disclosed herein, the information is discarded by the forwarding information manager. For example, the forwarding information manager may identify a source of each portion of information included in an information repository. If the source has a ranking that is below a predetermined threshold, the forwarding information manager may discard (e.g., remove) the information from the information repository without processing the information.

The method may end following step 204.

Returning to Step 202, the method may proceed to step 206 following step 202 if the source is determined to be desirable. In step 206, the information is processed. Processing the information may obtain updated forwarding information using the information.

In one or more embodiments disclosed herein, the updated forwarding information is obtained by updating the forwarding information using the information. For example, the forwarding information may be updated to match the information.

For example, consider a scenario where a network device is operably connected to a second network device via a first connection and a second connection. The first connection may be associated with a first egress port and the second connection may be associated with a second egress port. At a point in time, the first connection may be broken (e.g., a wire may become unplugged). After the first point in time, information reflecting the now inoperable first connection may be added to the information repository. When processed, the forwarding information of the network device that indicated that network data units may be forwarded to the second network device via the first egress port or the second egress port may be updated to reflect that network data units may only be forwarded to the second network device via the second egress port.

The method may end following step 206.

As discussed above, it may be determined whether a source of information is desirable when performing the method shown in FIG. 2.2. FIG. 2.2 shows a flowchart describing a method for determining whether a source of information is desirable in accordance with one or more embodiments disclosed herein. The method may be performed by, for example, a forwarding information manager (e.g., 102, FIG. 1.2) of a network device. Other entities may perform the method of FIG. 2.2 without departing from embodiments disclosed herein.

While the various steps in the flowchart shown in FIG. 2.2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 210, a current workload of a forwarding information manager is obtained.

In one or more embodiments disclosed herein, the current workload of the forwarding information manager is obtained from an information repository. For example, the workload of the forwarding information manager may be proportional to the amount of information included in the information repository. More information may indicate a buildup of information that has not yet been processed, hence, a heavier workload. The current workload may be inferred from the quantity of information included in the information repository. The current workload may be obtained via other methods without departing from the embodiments disclosed herein.

In Step 212, a desirability ranking for a source of the information is obtained.

In one or more embodiments disclosed herein, the desirability ranking is obtained from information source rankings. For example, an identity of the source may be matched to an entry of the information source rankings. A desirability ranking specified by the matched entry may be used as the desirability of the source of the information. Each entry of the information source rankings may include a corresponding identity of an information source. Each identity of an information source may match a corresponding entry of the information source rankings. Each of the entries of the information source rankings may include a desirability ranking corresponding to the source identified by the source identifier included in each respective entry.

The desirability ranking may be obtained via other methods without departing from embodiments disclosed herein. For example, a desirability ranking may be computed using a function based on an identity of a source. In another example, a desirability ranking may be obtained from another source (e.g., a different type of data structure from that of information source rankings).

In step 214, it is determined whether the current workload exceeds the desirability ranking.

In one or more embodiments disclosed herein, the determination is made by comparing the current workload to the desirability ranking. For example, a predetermined functional relationship between the current workload and the desirability ranking may be used to ascertain whether the current workload exceeds the desirability ranking. The functional relationship may, for example, indicate that as the current workload increases, the desirability ranking must increase or else the current workload will be considered to have exceeded the desirability ranking. The relationship may be, for example, linear, exponential, or another type of relationship.

The relationship may also include carve outs for specific types of sources. For example, the relationship may specify that some sources are to be considered to be desirable regardless of workload. Similarly, the relationship may specify that other sources are to be considered to be undesirable regardless of workload.

In some embodiments of the invention, the relationship may be implemented as a list that does not follow a conventional functional relationship (e.g., may include step functions or other features that are not easily definable mathematically using continuous number systems). The list may specify the output of a functional relationship for all possible inputs.

In one or more embodiments disclosed herein, each possible level of the current workload may be associated with a corresponding desirability ranking threshold. For a given current workload, if the desirability ranking does not exceed the corresponding desirability ranking, then the current workload may be determined as exceeding the desirability ranking.

If it is determined that the current workload exceeds the desirability ranking, the method may proceed to step 216. If the current workload is determined as not exceeding the desirability ranking, the method may proceed to step 218.

In step 216, the source is considered to be not desirable.

The method may end following step 216.

Returning to step 214, the method may proceed to step 218 if the current workload does not exceed the desirability ranking.

In step 218, the source is considered to be desirable.

The method may end following step 218.

As discussed above, the network data unit processor may perform network data unit forwarding. FIG. 2.3 shows a flowchart describing a method for forwarding network data units in accordance with one or more embodiments disclosed herein. The method may be performed by, for example, a network data unit processor (e.g., 106, FIG. 1.2) of a network device. Other entities may perform the method of FIG. 2.3 without departing from embodiments disclosed herein.

While the various steps in the flowchart shown in FIG. 2.3 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 220, a network data unit is obtained.

In one or more embodiments disclosed herein, the network data unit is obtained by receiving it via an ingress port. The network data unit may be obtained via other methods without departing from embodiments disclosed herein.

In step 222, one or more actions are identified, using forwarding information, to forward the network data unit.

In one or more embodiments disclosed herein, the one or more actions are identified by matching the network data unit (and/or information derived from the network data unit) to information included in the forwarding information. The matched information may specify the one or more actions. The one or more actions may include, for example, adding and/or removing encapsulation information (and/or other types of information) to/from the network data unit, forwarding the network data unit out of an egress port, etc.

The one or more actions may also include actions that are unrelated to forwarding of network data units. For example, the one or more actions may include device management actions such as modification of the manner of operating a device (e.g., obtaining data that is not used for forwarding network data units such as may be obtained from management plane connections or connections used to manage paths) or managing connections between devices (e.g., network data units that include diagnostic information regarding physical/logical connections between devices).

In one or more embodiments disclosed herein, the information matched in the forwarding information includes different contents depending on whether the forwarding information was updated. For example, depending on when step 222 is performed, the forwarding information may or may not have been updated when information regarding the network environment in which the network device resides is obtained depending on the desirability of the source of the information.

In step 224, the one or more actions are performed to forward the network data unit.

The method may end following step 224.

By performing any and/or all of the methods illustrated in FIGS. 2.1-2.3, forwarding information used to forward network data units may be selectively updated when information that could be used to update the forwarding information is obtained. By selectively updating the forwarding information, the computing resources of the network device may be conserved. For example, information obtained from less desirable sources may be selectively not processed. Consequently, network data units may be forwarded using forwarding information that is less computationally costly to maintain.

In one or more embodiments, a network device is a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (e.g., 10, FIG. 1.1) include, but are not limited to, a network switch, a router, a multilayer switch, a fiber channel device, an InfiniBand® device, etc. A network device (e.g., 10, FIG. 1.1) is not limited to the aforementioned specific examples.

In one or more embodiments, a network device (e.g., 10, FIG. 1.1) includes functionality to receive network data units (e.g., frames, packets, tunneling protocol frames, etc.) at any of the physical network interfaces (i.e., ports) of the network device (e.g., 10, FIG. 1.1) and to process the network traffic data units. In one or more embodiments, processing a network traffic data unit includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) determine how to route/forward the network traffic data unit in order to transmit the network traffic data unit from an interface of the network device (e.g., 10, FIG. 1.1).

In one or more embodiments, a network device (e.g., 10, FIG. 1.1) also includes and/or is operatively connected to device storage and/or device memory (i.e., non-transitory computer readable mediums used to provide persistent storage resources and/or memory resources) storing software and/or firmware.

Such software and/or firmware may include instructions which, when executed by the one or more processors) of a network device (e.g., 10, FIG. 1.1), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (e.g., 10, FIG. 1.1) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (e.g., 10, FIG. 1.1)) that facilitate network connectivity for one or more operatively connected devices (e.g., computing devices, data storage devices, other network devices, etc.). In one or more embodiments, the network device (e.g., 10, FIG. 1.1) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

To further clarify embodiments disclosed herein, a non-limiting example is provided in FIGS. 3.1-3.5. Each of these figures may illustrate a system similar to that illustrated in FIG. 1.1 at different points in times. For the sake of brevity, only a limited number of components of the system of FIG. 1.1 are illustrated in each of FIGS. 3.1-3.5.

Example

Consider a scenario as illustrate din FIG. 3.1 in which a client (320) is attempting to communicate with network devices (e.g., 300, 302, 304, 306, 308, 310). To communicate with the network devices, the client (320) may send network data units (322) to network device A (300) via an operable connection as illustrated by the line having arrows on both ends interconnecting the client (320) and the network device A (300).

Similarly, each of the other network devices may be operably connected to each other directly or through other network devices, as illustrated by the similar lines with ends terminating in arrows. For example, network device A (300) may be operably connected to network devices B and D (302, 306, respectively). Consequently, if network device A (300) obtained network data units (e.g., 322) from the client (320) that are to be forwarded towards other network devices operably connected to network device B or network device D, then network device A (300) may forward the network data units to one of these network devices (which in turn may forward the network data units towards other devices depending on information included in the network data units).

To forward network data units, network device A (300) may process information obtained from a variety of sources to maintain forwarding information. The forwarding information may be used to determine to which network device (e.g., 302, 306) to forward different network data units.

For example, network device D (306) may periodically send network discovery information to network device A (300) regarding the logical and/or physical network connectivity between itself and other network devices. Upon receipt of such information, network device A (300) may process the information to determine whether it should update its forwarding information used to forward network data units.

At a first point in time as illustrated in FIG. 3.2, network device B (302) enters a compromised state. Network device B (302) may enter a compromised state when, for example, a malicious attacker compromises the functionality of the network device, e.g., computer instructions which control the operation of the network device are corrupted, etc.

Additionally, the operable connection between network device A (300) and network device D (306) fails. The aforementioned failure modifies the network environment in which network device A (300) resides by rendering it unable to successfully forward packets to network device D (306). For example, in FIG. 3.2 network device A (300) may have a first egress port which operably connects it to network device B (302) and a second egress port which operably connected it to network device D (306) prior to the connection failure.

While in the compromised state, as illustrated in FIG. 3.3, the network device B (302) begins sending network discovery protocol data units (330) to network device A (300). The network discovery protocol data units (330) may be unsolicited by network device A (300), may not include information that may be used by the network device A (300) to update its forwarding information, and may be being sent repeatedly or in a manner that is inconsistent with a network discovery protocol.

In addition to obtaining the network discovery protocol data units (330), the network device A (300) also obtains local network discovery protocol information (340) regarding the connection between it and the network device D (306). For example, a network data unit processor of the network device A (300) may have identified that it was no longer operably connected to the network device D (306) via the second egress port.

Upon receipt of the network discovery protocol data units (330), one of the agents (104) hosted by the network device A (300) analyzes the obtained network discovery protocol data units (330) and determines that the informational content would not improve the forwarding information (112) used by network device A (300) to forward network data units, as illustrated in FIG. 3.4. After making the determination, the agent notifies the forwarding information manager (102) that the network discovery protocol data units (330) should not be processed.

In response to receiving the information regarding the processing of the network discovery protocol data units (330), the forwarding information manager (102) updates the information source rankings (114) by modifying the desirability ranking associated with network device B (302) to be very low for the next 15 minutes. Consequently, when the network discovery protocol data units (330) are in line for processing by the forwarding information manager (102), the forwarding information manager (102) discards the network discovery protocol data units (330), including the network topology information contained within, without updating the forwarding information (112) based on the information contained within the network discovery protocol data units (330).

The forwarding information manager (102) updates the forwarding information (112) to reflect that the network device A is no longer connected to network device D by the now inoperable connection. Consequently, as illustrated in FIG. 3.5, network device A (300) now forwards network data units only to network device B (302) even when destined for network device D (306).

Additionally, as noted above, after 15 minutes the desirability ranking associated with network device B (302) will revert to its previous value unless a new desirability ranking is applied. Consequently, should network device B (302) leave its compromised state and begin sending useful network discovery protocol data units in the future, network device A (300) may automatically begin processing and, thereby, update its forwarding information to reflect the useful network topology information that network device B (302) may provide in the future.

End of Example

As discussed above, embodiments disclosed herein may be implemented using computing devices. FIG. 4 shows a diagram of a computing device in accordance with one or more embodiments disclosed herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment disclosed herein, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments disclosed herein may provide a network device and/or method that is less likely to be negatively impacted when information that could be used to update its forwarding information is obtained that is not useful. For example, embodiments disclosed herein may provide a network device that automatically ignores (e.g., does not process) information that is unlikely to improve its ability to forward network data units. By doing so, a network device that more efficiently marshals its limited computing resources may be provided. By more efficiently marshalling its limited computing resources, the network device may improve the rate of processing information that is more likely to improve its ability to forward network data units. Consequently, a network device in accordance with one or more embodiments disclosed herein may be more capable of dealing with a network environment in which the topology and/or network data unit transmission capabilities are changing (i.e., a dynamic network environment) by modifying the manner in which it forwards network data units to better match the topology of the network environment.

Thus, embodiments disclosed herein may address the problem of changes in network topology by more efficiently marshalling limited computing resources for updating network data unit forwarding behavior to match the topology. While embodiments have been described as addressing on or more specific challenges relating to network environments, embodiments disclosed herein are broadly applicable to addressing many networking challenges and the embodiments should not be construed as only addressing or being usable to solve the specific challenges discussed above.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope embodiments described herein should be limited only by the attached claims.

What is claimed is:

1. A network device, comprising:
   storage for storing:
     information, and
     rankings of a plurality of information sources based on associated desirability metrics; and
   an information manager programmed to:
     obtain the information from a source of the plurality of information sources;
     make a determination, based on the rankings of the plurality of information sources, that a desirability metric of the source is below a threshold value, wherein the threshold value is based on a current workload of the information manager;
     based on the determination, discard the information without processing the information;
   a network data unit processor programmed to:
     obtain a network data unit after the information is discarded; and
     process the network data unit without using the information.

2. The network device of claim 1, wherein the information manager is further programmed to:
   obtain second information from a second source;
   make a second determination, based on the information source rankings, that a desirability metric of the second source is above the threshold value;
   based on the second determination, process the second information;
   the network data unit processor further programmed to:
     obtain a second network data unit after the second information is processed; and
     process the second network data unit based on the processed second information.

3. The network device of claim 2, wherein processing the second information comprises obtaining updated information based on the second information, wherein the network data unit is processed based on the updated information.

4. The network device of claim 1, wherein making the determination, based on the information source rankings, that the desirability metric of the source is below the threshold value comprises:
   identifying a desirability ranking from the information source rankings; and
   comparing the desirability ranking to the threshold value.

5. The network device of claim 4, wherein the threshold value is dynamic, and as a workload increases, the threshold value increases.

6. The network device of claim 1, wherein the information source rankings comprise a blacklist, and wherein the source is listed on the blacklist at the time of the determination and removed from the blacklist after the determination.

7. The network device of claim 1, wherein the information is discarded by removing the information from an information repository such that the information is not processed.

8. A method for processing network data units, comprising:
  obtaining information from a source;
  making a determination, by an information manager, based on rankings of a plurality of information sources based on associated desirability metrics, that a desirability metric of the source is below a threshold value, wherein the threshold value is based on a current workload of the information manager;
  based on the determination, discarding the information without processing the information;
  obtaining a network data unit of the network data units after the information is discarded; and
  processing the network data unit using other information that is not based on the information.

9. The method of claim 8, further comprising:
  obtaining second information from a second source;
  making a second determination, based on the information source rankings, that a desirability metric of the second source is above the threshold value;
  based on the second determination, processing the second information to obtain updated information;
  obtaining a second network data unit after the updated information is obtained; and
  processing the second network data unit using the updated information.

10. The method of claim 9, wherein the updated information specifies to which entities network data units are to be forwarded.

11. The method of claim 8, wherein making the determination, based on the information source rankings, that the desirability metric of the source is below the threshold value comprises:
  identifying a desirability ranking from the information source rankings; and
  comparing the desirability ranking to the threshold value.

12. The method of claim 11, wherein the threshold value is dynamic, and wherein as the workload increases, the threshold value increases.

13. The method of claim 8, wherein the information source rankings comprise a blacklist, wherein the source is on the black list.

14. The method of claim 8, wherein the information is discarded by removing the information from an information repository before the information is processed.

15. A non-transitory computer readable medium comprising computer readable program code, which when executed by a computer processor enables the computer processor to perform a method, the method comprising:
  obtaining, by a network device, information from a source;
  making a determination, by an information manager, based on rankings of a plurality of information sources based on associated desirability metrics, that a desirability metric of the source is above a threshold value, wherein the threshold value is based on a current workload of the information manager, and wherein making the determination comprises:
  identifying a desirability ranking of the source from the rankings of the plurality of information sources; and
  comparing the desirability ranking to the threshold value;
  based on the determination, processing the information to obtain updated information;
  processing a network data unit using the updated information.

16. The non-transitory computer readable medium of claim 15, wherein the threshold value is dynamic, and as the workload increases, the threshold value increases.

17. The non-transitory computer readable medium of claim 15, wherein the information manager is further programmed to:
  obtain second information from a second source;
  make a second determination, based on the information source rankings, that a desirability metric of the second source is below the threshold value;
  based on the second determination, discard the second information;
  the network data unit processor further programmed to:
    obtain a second network data unit after the second information is discarded; and
    process the second network data unit without using the second information.

* * * * *